(12) United States Patent
Kim et al.

(10) Patent No.: US 7,953,514 B2
(45) Date of Patent: May 31, 2011

(54) ARTICLE STORAGE FACILITY AND OPERATING METHOD THEREOF

(75) Inventors: Jaesook Kim, Konan (JP); Toshihito Ueda, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 846 days.

(21) Appl. No.: 11/893,706

(22) Filed: Aug. 17, 2007

(65) Prior Publication Data

US 2008/0044262 A1 Feb. 21, 2008

(30) Foreign Application Priority Data

Aug. 17, 2006 (JP) .................................. 2006-222475

(51) Int. Cl.
*G06F 19/00* (2006.01)
(52) U.S. Cl. ........................................... 700/214; 901/3
(58) Field of Classification Search ...... 901/3; 700/215, 700/226, 214; 318/568.13
See application file for complete search history.

(56) References Cited

U.S. PATENT DOCUMENTS

| | | | | |
|---|---|---|---|---|
| 5,418,732 A | * | 5/1995 | McFadin | 700/215 |
| 5,652,489 A | * | 7/1997 | Kawakami | 318/587 |
| 5,790,338 A | * | 8/1998 | Kanai et al. | 360/71 |
| 5,963,514 A | * | 10/1999 | Kanetsuku et al. | 369/30.34 |
| 6,366,707 B1 | * | 4/2002 | Gardner et al. | 382/287 |
| 6,574,529 B1 | * | 6/2003 | Lundeen et al. | 700/218 |
| 6,671,574 B1 | * | 12/2003 | Hashimoto | 700/215 |
| 7,003,375 B2 | * | 2/2006 | Inui | 700/218 |
| 7,221,276 B2 | * | 5/2007 | Olsen et al. | 340/572.1 |
| 7,291,855 B1 | * | 11/2007 | Mihara | 250/559.33 |
| 2008/0118335 A1 | * | 5/2008 | Ishida et al. | 414/280 |

FOREIGN PATENT DOCUMENTS

JP H08-244914 9/1996

* cited by examiner

*Primary Examiner* — Saúl J Rodríguez
*Assistant Examiner* — Joshua I Rudawitz
(74) *Attorney, Agent, or Firm* — The Webb Law Firm

(57) ABSTRACT

A learning marker configured such that one of learning horizontal distance information and learning vertical distance information can be learned based on detection information from a horizontal travel distance detection device or a vertical travel distance detection device upon detection of at least one edge section of the learning marker in one direction of a horizontal travel direction and a vertical travel direction of a transfer means by a learning marker detector for detecting the learning marker, and the other of the learning horizontal distance information and learning vertical distance information can be learned based on detection information from the horizontal travel distance detection device or the vertical travel distance detection device upon detection of each of both edge sections of the learning marker in the one direction by the learning marker detector.

14 Claims, 8 Drawing Sheets

ARTICLE STORAGE FACILITY AND OPERATING METHOD THEREOF

BACKGROUND OF THE INVENTION

The present invention relates to article storage facility and an operating method thereof.

Article storage facility is, for example, applied in automatic warehouses and the like. The article is loaded into the storage section of the article storage shelf or the article is unloaded from the storage section of the article storage shelf by moving a transfer means of article transportation equipment horizontally and vertically in a traveling space so as to be positioned at a target stop position of a storage section, and by performing loading or unloading of an article at that target stop position using the transfer means.

The target stop position is a position suitable for performing loading and unloading of the article, and target stop positions are determined for each of the plurality of storage sections. The target stop positions are determined from target horizontal distance information from a standard horizontal position in a horizontal travel direction of the transfer means and from target vertical distance information from a standard vertical position in a vertical travel direction of the transfer means.

However, it is difficult to assembly an article storage shelf such that each storage section is positioned without error in a pre-defined design position. Accordingly, target horizontal distance information and the target vertical distance information related to a target stop position at each of the plurality of storage sections is determined by moving the transfer means in actuality with the article storage shelf in an assembled condition.

A conventional article storage facility comprises a plurality of learning markers provided with the installation position thereof in the horizontal travel direction and the vertical travel direction of the transfer means being set in order to determine the target horizontal distance information and the target vertical distance information with respect to each of the plurality of storage sections and a learning marker detection means moving as one with the transfer means and detecting a learning marker. A control means is configured to learn, with regard to each of the plurality of leaning markers, learning horizontal distance information from a standard horizontal position in the horizontal travel direction of the transfer means and learning vertical distance information from a standard vertical position in the vertical travel direction of the transfer means based on detection information of a horizontal travel distance detection means and detection information of a vertical travel distance detection means upon detection of the learning marker by the learning marker detection means and to determine the target horizontal distance information and the target vertical distance information based on that learned learning horizontal distance information and learning vertical distance information and information related to an installation setting condition (see, JP H08-244914, for example).

In this conventional article storage facility, the learning marker is formed having a rectangular shape when viewed from above and is configured such that the learning horizontal distance information can be learned based on detection information of a horizontal travel distance detection means upon detection by the learning marker detection means of each of both end sections thereof in the horizontal travel direction of the transfer means, and also, the learning vertical distance information can be learned based on detection information of a vertical travel distance detection means upon detection by the learning marker detection means of each of both end sections thereof in the vertical travel direction of the transfer means.

In this conventional article storage facility, learning horizontal distance information is learned by moving the transfer means horizontally so as to detect each of both end sections of the learning marker in the horizontal travel direction of the transfer means using the learning marker detection means, and also, learning vertical distance information is learned by moving the transfer means vertically so as to detect each of both end sections of the learning marker in the vertical travel direction of the transfer means using the learning marker detection means. Accordingly, in order to learn learning horizontal distance information and learning vertical distance information for each of the plurality of learning markers, the transfer means must be moved horizontally so as to detect each of both end sections of the learning marker in the horizontal travel direction of the transfer means using the learning marker detection means, and the transfer means must be moved vertically so as to detect each of both end sections of the learning marker in the vertical travel direction of the transfer means using the learning marker detection means.

To explain further, in order to learn learning horizontal distance information and learning vertical distance information for each of the plurality of learning markers, for example, first of all, the transfer means is moved so as to perform sequential detection regarding all of the plurality of learning markers using the learning marker detection means in a configuration whereby the transfer means is moved horizontally so as to sequentially detect the plurality of learning markers lined up in the horizontal travel direction of the transfer means using the learning marker detection means, and when the transfer means has been moved to an end section of the article storage shelf in the horizontal travel direction of the transfer means, the transfer means is turned back at that end section of the article storage shelf, and at a position adjacent in the vertical travel direction of the transfer means, the plurality of learning markers lined up in the horizontal travel direction of the transfer means is sequentially detected using the learning marker detection means. The transfer means must be moved so as to perform sequential detection regarding all of the plurality of learning markers using the learning marker detection means in a configuration whereby the transfer means is moved vertically so as to sequentially detect the plurality of learning markers lined up in the vertical travel direction of the transfer means using the learning marker detection means, and when the transfer means has been moved to an end section of the article storage shelf in the vertical travel direction of the transfer means, the transfer means is turned back at that end section of the article storage shelf, and at a position adjacent in the horizontal travel direction of the transfer means, the plurality of learning markers lined up in the vertical travel direction of the transfer means is sequentially detected using the learning marker detection means.

In this way, in order that the learning horizontal distance information and learning vertical distance information may be learned, the distance of motion of the transfer means becomes long, the learning operation for learning of learning horizontal distance information and learning vertical distance information is complicated, and there is a danger of the time required for that learning operation increasing.

SUMMARY OF THE INVENTION

The present invention focuses on issues of this kind, and the object thereof is to provide article storage facility enabling learning operations for the learning of learning horizontal distance information and learning vertical distance information to be simplified and for the time required for these operations to be reduced.

In view of this object, the article storage facility comprises an article storage shelf having a plurality of storage sections lined up in a vertical direction and a horizontal direction, transfer means for transferring an article out of and into the storage sections, an article transporting device having a horizontal travel means for moving the transfer means horizontally within a traveling space in front of the article storage shelf and a vertical travel means for moving the transfer means vertically within the traveling space in front of the article storage shelf, a horizontal travel distance detection means for detecting a horizontal travel distance in the horizontal travel direction of the transfer means from a standard horizontal position to the transfer means, a vertical travel distance detection means for detecting a vertical travel distance in the horizontal travel direction of the transfer means from a standard vertical position to the transfer means, a control means for controlling an operation of the horizontal travel means, an operation of the vertical travel means, and an operation of the transfer means, a plurality of learning markers installed for each of the plurality of storage sections based on an installation setting condition for determining target horizontal distance information and target vertical distance information for each of the plurality of storage sections, and a learning marker detection means, provided on the article transporting device so as to move as one with the transfer means, for detecting the learning markers; wherein the control means, based on the target horizontal distance information from the standard horizontal position in a horizontal travel direction of the transfer means and the target vertical distance information from the standard vertical position in a vertical travel direction of the transfer means for a target stop position corresponding to each of the plurality of storage sections, and on detection information from the horizontal travel distance detection means and detection information from the vertical travel distance detection means, controls an operation of the horizontal travel means and an operation of the vertical travel means in order to position the transfer means at the target stop positions of the storage sections and controls an operation of the transfer means in order to transfer the article out of and into the storage sections using the transfer means at the target stop positions; the control means is configured to learn learning horizontal distance information from the standard horizontal position in the horizontal travel direction of the transfer means and learning vertical distance information from the standard vertical position in the vertical travel direction of the transfer means for each of the plurality of learning markers based on detection information from the horizontal travel distance detection means or the vertical travel distance detection means upon detection of the learning marker by the learning marker detection means, and to determine the target horizontal distance information and the target vertical distance information based on the learned learning horizontal distance information and learning vertical distance information and on information corresponding to the installation setting condition; and the learning marker is configured such that one of the learning horizontal distance information and the learning vertical distance information can be learned based on detection information from the horizontal travel distance detection means or the vertical travel distance detection means upon detection of at least one edge section of the learning marker in one direction of the horizontal travel direction and the vertical travel direction of the transfer means by the learning marker detection means, and the other of the learning horizontal distance information and the learning vertical distance information can be learned based on detection information from the horizontal travel distance detection means or the vertical travel distance detection means upon detection of each of both edge sections of the learning marker in the one direction by the learning marker detection means.

DETAILED DESCRIPTION OF PREFERRED EMBODIMENTS

The following is a description of preferred embodiments of an item of article storage facility, with reference to the accompanying drawings.

Figure 1:
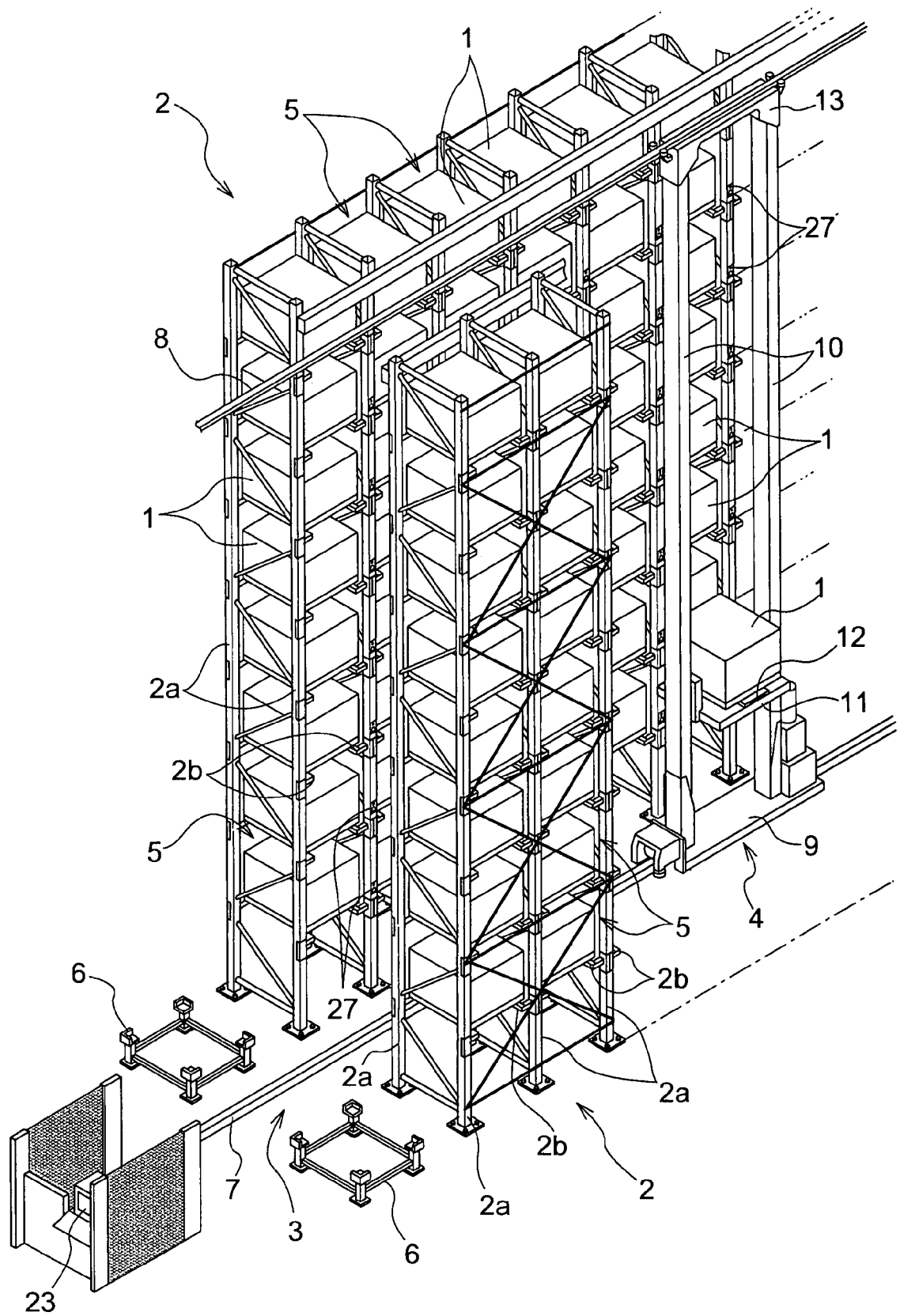
FIG. 1 is a perspective view of an item of article storage facility.

As shown in FIG. 1, this article storage facility comprises a pair of article storage shelves 2, disposed with an interval therebetween such that front surfaces for loading and unloading of an article 1 are mutually opposed, and a stacker crane 4 as an example of an article transporting device driving in a reciprocating and automatic fashion within a traveling space 3 formed between the pair of article storage shelves 2.

Each article storage shelf 2 has a plurality of pairs of front and rear supports 2a erected at intervals in a direction of shelf longitudinal width (a horizontal direction), and each of the pairs of front and rear supports 2a is provided with a plurality of mounting and support sections 2b disposed at intervals in a vertical direction.

A storage section 5 stores the article 1 by mounting and supporting the article 1 using a pair of left and right mounting and support sections 2b. Furthermore, a plurality of storage sections 5 are lined up in a direction of shelf vertical width (a vertical direction) and in a direction of shelf longitudinal width.

A load placing stand for loading and unloading 6, mounting and supporting the article 1 loaded into the article storage shelf 2 or the article 1 unloaded from the article storage shelf 2, is disposed at a position adjacent to the article storage shelves 2 in a direction of shelf longitudinal width.

A travel rail 7, traversing a complete range of the article storage shelves 2 in a direction of shelf longitudinal width and the load placing stand for loading and unloading 6, is provided on a floor surface within the traveling space 3. A guide rail 8, traversing a complete range of the article storage shelves 2 in a direction of shelf longitudinal width and the load placing stand for loading and unloading 6, is provided at a side towards a ceiling. While being guided by the guide rail 8, the stacker crane 4 moves horizontally on the travel rail 7.

Figure 2:
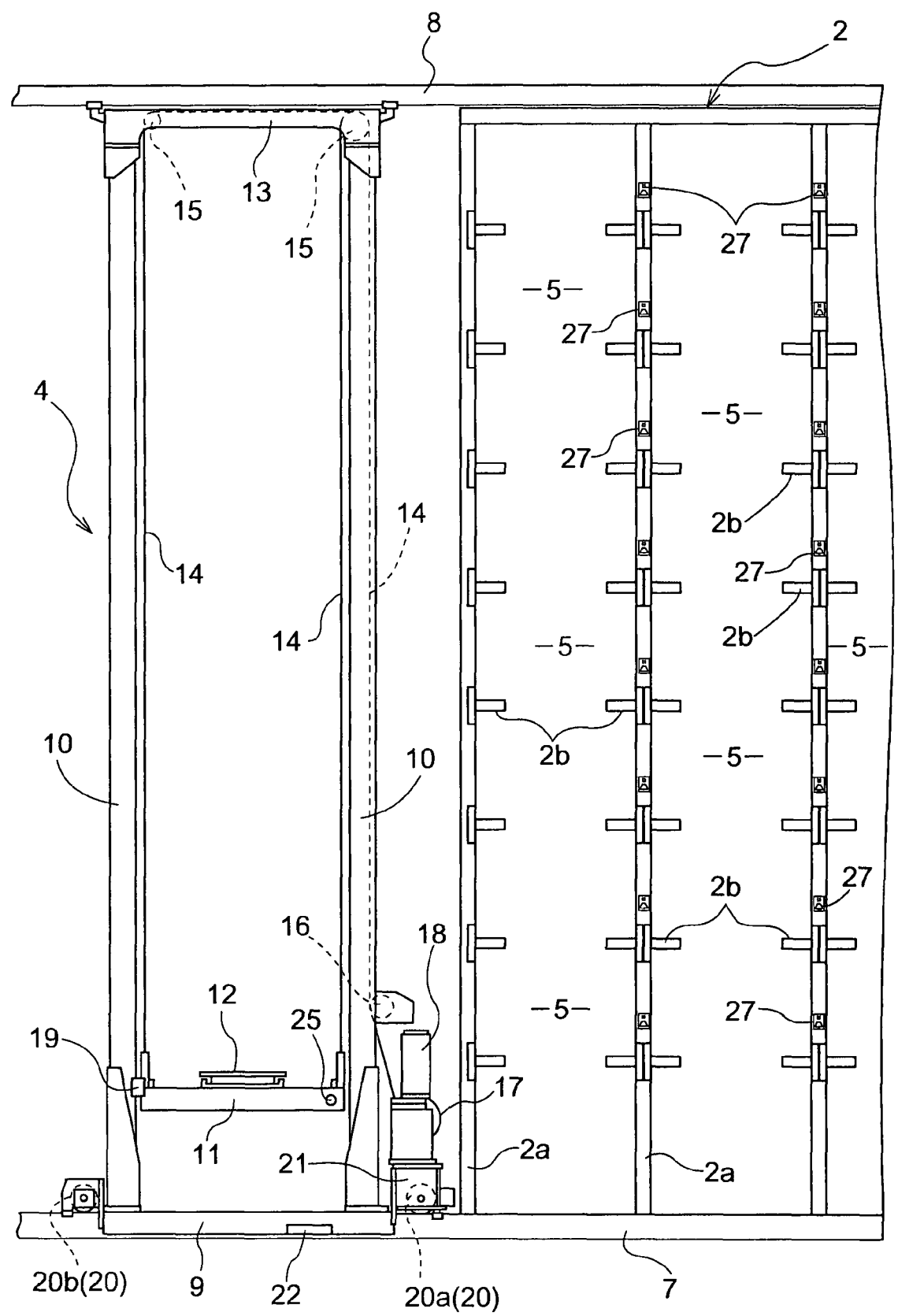
FIG. 2 is a side view of a stacker crane.

As shown in FIG. 2, the stacker crane 4 is provided with a travel dolly 9 capable of traveling freely along the travel rail 7, an elevator platform 11 capable of ascending and descending freely along an elevator mast 10 provided on the travel dolly 9, and an article transfer device 12 attached to the elevator platform 11 as a means for transfer. This article transfer device 12 can be a conventional device having, for example, a plurality of long arms, and can be a fork-type article transfer device wherein these long arms are moved in a direction of the article storage shelf 2 by a mechanism having a motor and chain, etc. Alternatively, a robot-type article transfer device having a first arm capable of swinging horizontally about a first vertical axis and a second arm capable of swinging horizontally about a second vertical axis disposed at an end section of this first arm can be used. In this way, the stacker crane 4 can move the article transfer device 12 horizontally through a travel operation of the travel dolly 9, and in addition, can move the article transfer device 12 vertically through an elevation operation of the elevator platform 11. Accordingly, the stacker crane 4 transfers the article 1 with respect to the load placing stand for loading and unloading 6 and loads or unloads the article 1 with respect to the storage section 5 through a travel operation of the travel dolly 9, an elevation operation of the elevator platform 11, and a transfer operation of the article transfer device 12.

In the stacker crane 4, an elevator mast 10 is provided at each of a front end section and a rear end section of the travel dolly 9, or in other words, a front and rear pair of elevator masts 10 is provided. In addition, an upper frame 13, connecting an upper end section of each of the front and rear pair of elevator masts 10, is provided at an upper end section of the elevator masts 10. This upper frame 13 is guided by the guide rail 8.

The elevator platform 11 is guided and supported so as to be capable of ascending and descending freely by the front and rear pair of elevator masts 10 provided on the travel dolly 9, and the elevator platform 11 is suspended and supported by an elevation wire 14 connected to both end sections thereof.

Each elevation wire 14 is wound about a guide pulley 15 provided on the upper frame 13 and a guide pulley 16 provided on one of the elevator masts 10 and is wound around a wind-up drum 17 provided at one edge of the travel dolly 9.

The wind-up drum 17 is connected to an inverter-type, an elevation electric motor 18 as a means for vertical motion and is driven thereby. By driving rotation in a forward direction or a reverse direction, the elevation electric motor 18 performs reeling-out or reeling-in of the elevator wires 14, causing the elevator platform 11 to move vertically and causing the article transfer device 12 to move vertically. A conventional electric motor 18 not of the inverter type can be used as the vertical travel means. Furthermore, the elevator platform 11 can be moved vertically by an engagement section provided on the elevator mast 10 and a gear engaging with this engagement section and driven by an electric motor, with the engagement section and the gear provided as a part of the vertical travel means and in place of the elevator wires 14.

The elevator platform 11 is provided with an elevation rotary encoder 19 as a means for vertical travel distance detection, detecting a vertical travel distance from a standard vertical position to the article transfer device 12 in a vertical travel direction of the article transfer device 12.

The standard vertical position is set at a position of the article transfer device 12 when the elevator platform 11 is positioned on the travel dolly 9, or in other words, a position of the article transfer device 12 when the elevator platform 11 is in contact with a top surface of the travel dolly 9. Although omitted from the figure, detection of the standard vertical position is carried out by detecting a detection mating protrusion provided at a side towards the travel dolly 9 or a part of the travel dolly 9 using a detector such as a limit switch provided at a side towards the elevator platform 11. A sprocket engaging with a chain provided along a longitudinal direction of the elevator mast 10 is provided on a rotating shaft of the elevation rotary encoder 19, and by detecting a vertical travel distance of the elevator platform 11 after detection of the standard vertical position, the vertical travel distance from the standard vertical position to the article transfer device 12 is detected.

The travel dolly 9 of the stacker crane 4 is provided with a pair of front and rear travel wheels 20, disposed at an interval in a longitudinal direction of the travel rail 7. Of the pair of front and rear travel wheels 20, a travel wheel 20a is configured as a drive wheel, and another travel wheel 20b is configured as a driven wheel capable of rotating freely. The driven wheel 20a is provided with an inverter-type, travel electric motor 21 as a means for horizontal motion. By driving rotation in a forward direction or a reverse direction, the travel electric motor 21 moves the article transfer device 12 horizontally by driving the travel dolly 9 along the travel rail 7. A conventional electric motor not of the inverter type can be used as the horizontal travel means.

The travel dolly 9 is provided with a travel rotary encoder 22 as a means for horizontal travel distance detection, detecting a horizontal travel distance from a standard horizontal position to the article transfer device 12 in a horizontal travel direction of the article transfer device 12.

The standard horizontal position is set at an end section of the travel rail 7 at a side towards the load placing stand for loading and unloading 6. Although omitted from the figure, detection of this standard horizontal position is carried out by detecting a detection mating protrusion provided at a side towards the ground by a detector such as a limit switch provided at a side towards the travel dolly 9. A sprocket engaging with a chain provided along a longitudinal direction of the travel rail 7 is provided on a rotating shaft of the travel rotary encoder 22, and by detecting a horizontal travel distance of the travel dolly 9 after detection of the standard horizontal position, the horizontal travel distance from the standard horizontal position to the article transfer device 12 is detected.

Figure 3:
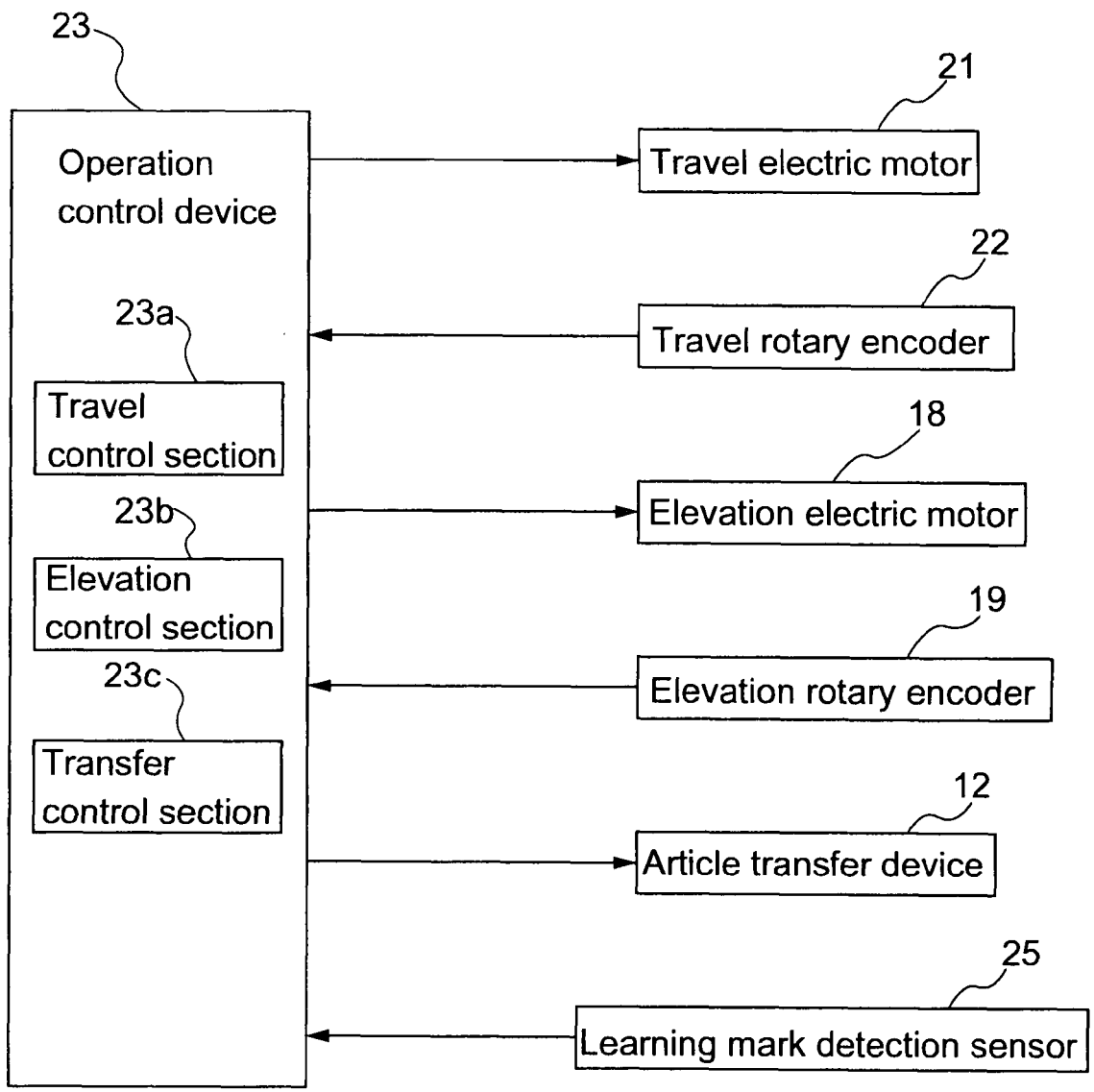
FIG. 3 is a control block drawing of an item of article storage facility.

As shown in FIG. 3, an operation control device 23 is provided as a means for control, controlling an operation of the stacker crane 4. The operation control device 23 selects the load placing stand for loading and unloading 6 to be subjected to a transfer operation from the two load placing stands for loading and unloading 6; controls a travel operation of the travel dolly 9 and an elevation operation of the elevator platform 11 in order to move the article transfer device 12 to a target stop position corresponding to the load placing stand for loading and unloading 6 to be subjected to the transfer operation; and controls a transfer operation of the article transfer device 12 such that the article transfer device 12 transfers the article 1 with respect to the load placing stand for loading and unloading 6 at that target stop position. Similarly, the operation control device 23 selects a storage section 5 to be subjected to a transfer operation from the plurality of storage sections 5; controls a travel operation of the travel dolly 9 and an elevation operation of the elevator platform 11 in order to move the article transfer device 12 to a target stop position corresponding to the storage section 5 to be subjected to a transfer operation; and controls a transfer operation of the article transfer device 12 such that the article transfer device 12 performs loading or unloading of the article 1 with respect to the storage section 5 to be subjected to a transfer operation at that target stop position.

The operation control device 23 can comprise two controllers capable of mutual communication in the form of a ground-side controller provided at a side towards the ground and a crane-side controller provided on the stacker crane 4. Furthermore, the operation control device 23 can also comprise a single controller provided at a side towards the ground and capable of communicating with devices such as the travel electric motor 21 and the elevation electric motor 18, etc., provided on the stacker crane 4. The controllers are conventional-technology controllers and comprise an algorithm for performing the control explained herein, memory for recording data, a CPU for performing an algorithm, and sections for the input and output of information and data.

The target stop position related to the storage section 5 is a position suitable for performing loading and unloading of the article 1 with respect to the storage section 5, and target stop positions are set for each of the plurality of storage sections 5. The target stop position is set using target horizontal distance information from a standard horizontal position in the horizontal travel direction of the article transfer device 12 and using target vertical distance information from a standard vertical position in the vertical travel direction of the article transfer device 12.

In this embodiment, a loading-use target stop position corresponding to loading (that is to say, storing) of the article 1 with respect to the storage section 5 is set as the target stop position related to the storage section 5. The loading-use target stop position is set such that collision of the article 1 with the supports 2a and the mounting and support sections 2b can be avoided when, with the article 1 in a mounted and supported condition, the forks of the article transfer device 12 are retracted.

Furthermore, an extraction-use (that is to say, removing-use) target stop position corresponding to removal of the article 1 from the storage section 5 is set more towards a side of lower setting distance in the vertical travel direction of the article transfer device 12 than the loading-use target stop position.

As with the target stop position related to the storage section 5, the target stop position related to the load placing stand for loading and unloading 6 is also a position suitable for performing transfer of the article 1 with respect to the load placing stand 6, and as with the target stop position related to the storage section 5, the target stop position related to the load placing stand for loading and unloading 6 is set using target horizontal distance information from a standard horizontal position in the horizontal travel direction of the article transfer device 12 and using target vertical distance information from a standard vertical position in the vertical travel direction of the article transfer device 12.

The operation control device 23 comprises a travel control section 23a controlling an operation of the travel electric motor 21 based on target horizontal distance information and detection information from the travel rotary encoder 22 in order to horizontally move the article transfer device 12 in the horizontal travel direction of the article transfer device 12 to the target stop position; an elevation control section 23b controlling an operation of the elevation electric motor 18 based on target vertical distance information and detection information from the elevation rotary encoder 19 in order to vertically move the article transfer device 12 in the vertical travel direction of the article transfer device 12 to a target stop position; and a transfer control section 23c controlling a transfer operation of the article transfer device 12 in order to perform transfer of the article 1 with respect to the load placing stand 6 or loading and unloading of the article 1 with respect to the storage section 5.

The travel control section 23a causes the travel electric motor 21 to start operation, starts a travel operation of the travel dolly 9, stops the operation of the travel electric motor 21 when the horizontal travel distance detected by the travel rotary encoder 22 reaches the target horizontal distance information corresponding to the storage section 5 or the load placing stand 6 to be subjected to a transfer operation, and positions the article transfer device 12 at a target stop position in the horizontal travel direction of the article transfer device 12.

When loading (that is to say, storing) the article 1 into the storage section 5 or the load placing stand 6, the elevation control section 23b causes the elevation electric motor 18 to start operation, starts an elevation operation of the elevator platform 11, stops the operation of the elevation electric motor 18 when the vertical travel distance detected by the elevation rotary encoder 19 reaches the target vertical distance information corresponding to the storage section 5 or the load placing stand 6 to be subjected to a transfer operation, and positions the article transfer device 12 at a target stop position in the vertical travel direction of the article transfer device 12. Furthermore, when extracting (that is to say, removing) the article 1 from the storage section 5 or the load placing stand 6, the elevation control section 23b performs an operation similar to that when loading the article 1 into the storage section 5 or the load placing stand 6 and positions the article transfer device 12 at an extraction-use target stop position, located away from the target stop position in a downward direction by exactly a setting distance.

When loading the article 1 into the storage section 5 or the load placing stand 6, the transfer control section 23c operates the fork-type article transfer device 12 such that, after extending the forks with the article 1 in a mounted and supported condition, the article transfer device 12 is lowered to the extraction-use target stop position by lowering the elevator platform 11, the article 1 is loaded into the storage section 5 or the load placing stand 6, and then, the forks are retracted. Furthermore, when extracting the article 1 from the storage section 5 or the load placing stand 6, the transfer control section 23c operates the fork-type article transfer device 12 such that, after extending the forks, the article transfer device 12 is elevated to the target stop position by raising the elevator platform 11, the article 1 is raised up, and then, with the article 1 in a mounted and supported condition, the forks are retracted.

In order to move the article transfer device 12 to the target stop positions corresponding to each of the plurality of storage sections 5, the operation control device 23 must acquire target horizontal distance information and target vertical distance information related to a plurality of target stop positions.

Figure 4:
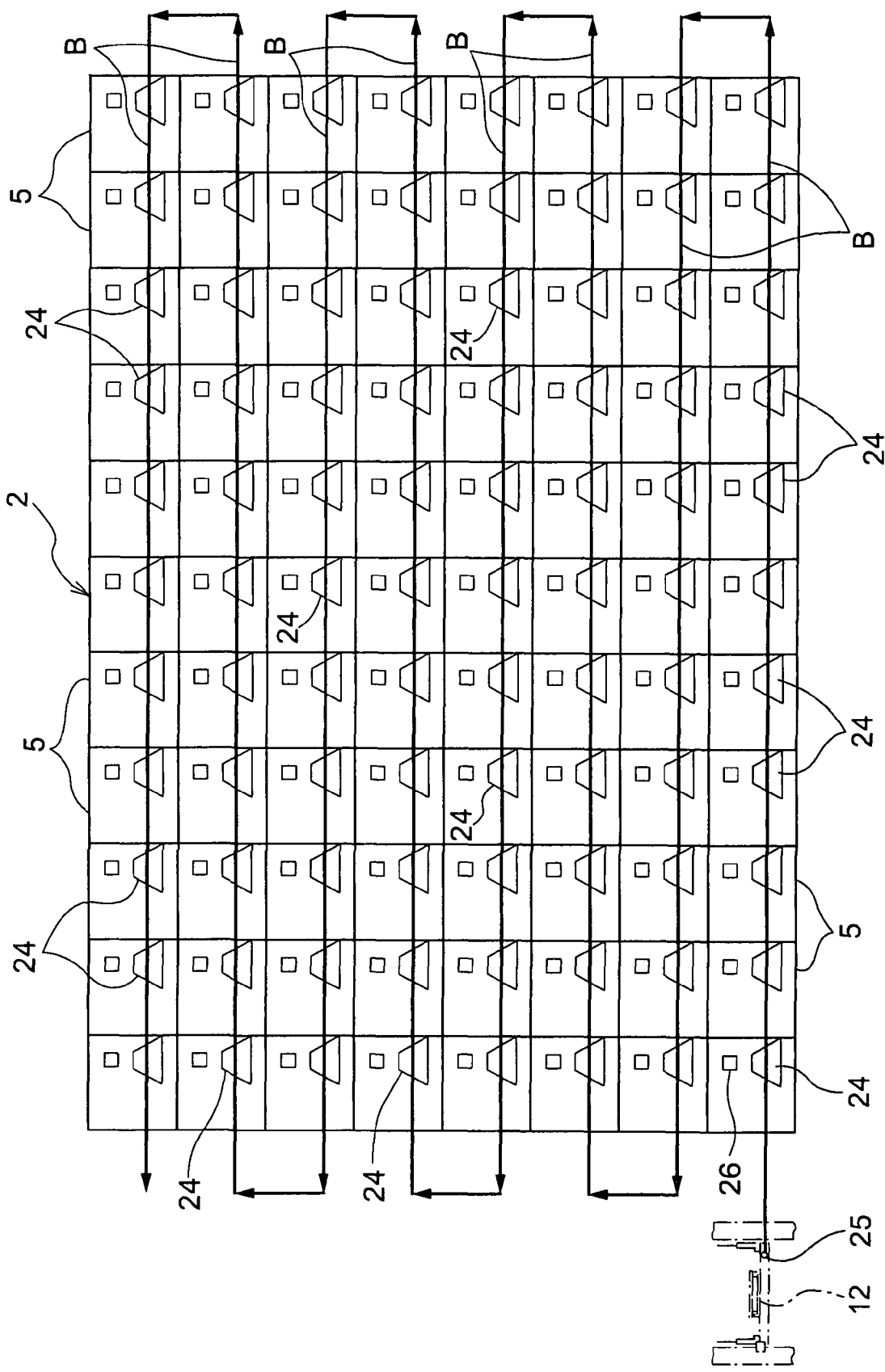
FIG. 4 is a schematic diagram of storage sections of an item of article storage shelf.

Accordingly, as shown in FIG. 4, the operation control device 23 learns learning horizontal distance information from a standard horizontal position in the horizontal travel direction of the article transfer device 12 and learning vertical distance information from a standard vertical position in the vertical travel direction of the article transfer device 12 related to each of a plurality of learning markers 24 based on detection information from the travel rotary encoder 22 upon detection of the learning markers 24 using a learning marker detection sensor 25 as a means for learning marker detection. The operation control device 23 is configured to determine the target horizontal distance information and the target vertical distance information based on the learning horizontal distance information and learning vertical distance information learned thereby together with information corresponding to an installation setting condition explained hereinafter. FIG. 4 is a view illustrating each of the storage sections 5 of the article storage shelves 2 in a schematic fashion.

The learning marker detection sensor 25 of this embodiment comprises an optical sensor detecting the learning marker 24 and a stop position confirmation marker 26 by projecting measurement-purpose light and receiving reflected light. As the learning marker detection sensor 25 is a conventional-technology sensor, a detailed explanation thereof is omitted; however, any sensor of the convention technology capable of accurately and reliably detecting the learning marker 24 and the stop position confirmation marker 26 can be used.

Figure 5:
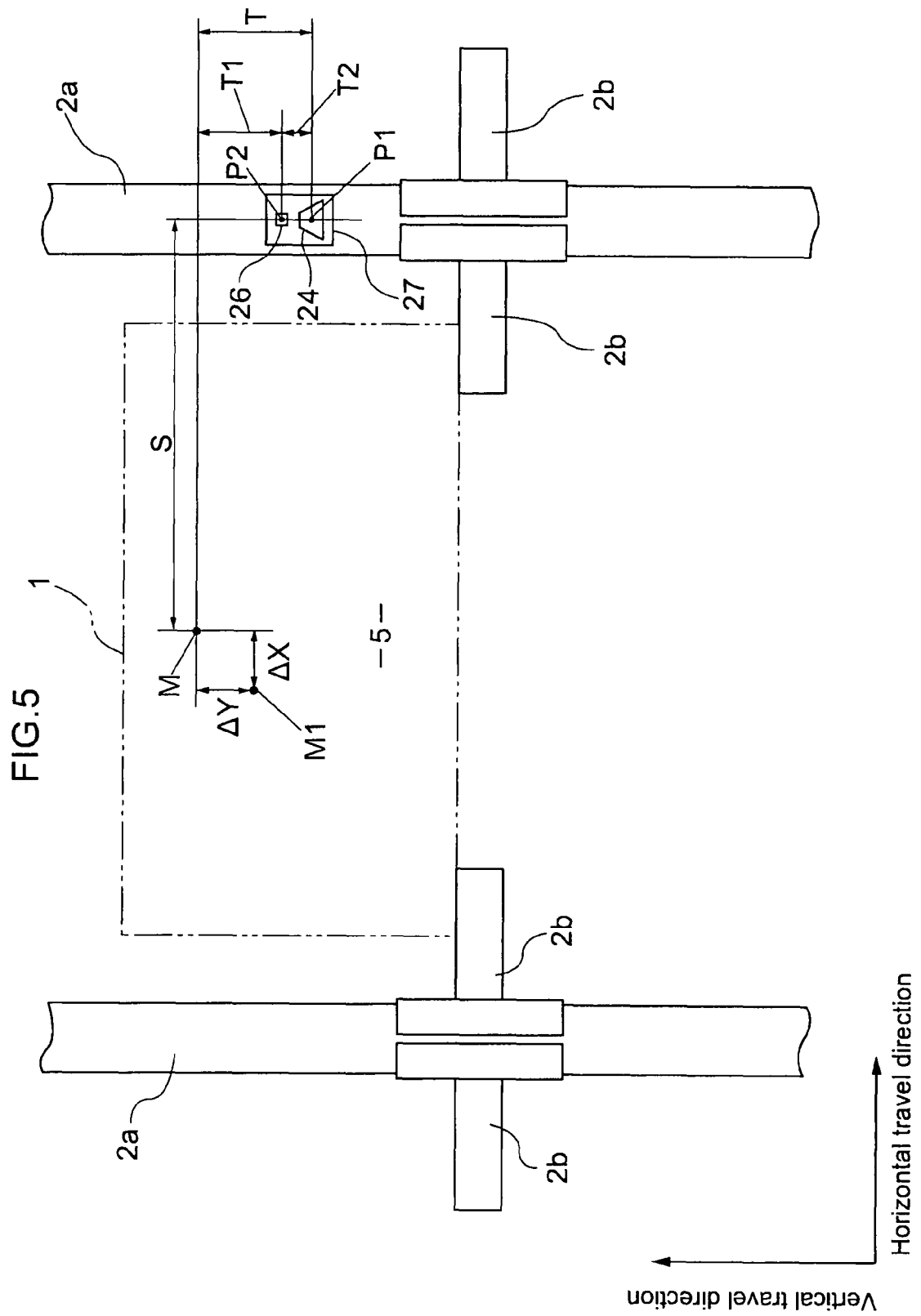
FIG. 5 is an enlarged view of a storage section.

As shown in FIG. 5, the learning marker 24 is installed in a condition such that the installation position thereof with respect to each of the plurality of storage sections 5 in the horizontal travel direction and the vertical travel direction of the article transfer device 12 is set to an installation setting condition for determining the target horizontal distance information and the target vertical distance information.

As shown in FIG. 2, the learning marker detection sensor 25 is provided on the stacker crane 4 so as to move as one with the article transfer device 12 and is configured to detect the learning marker 24.

Hereinafter, the learning marker 24 is explained with reference to FIG. 5 and FIG. 6.

The learning marker 24 is installed such that the center P1 thereof is positioned at a setting horizontal distance S away from a target stop position M in the horizontal travel direction of the article transfer device 12 and at a setup vertical distance T away from the target stop position M in the vertical travel direction of the article transfer device 12.

In this way, the installation setting condition at the installation position of the learning marker 24 is set to a condition whereby the target stop position is located at a setup horizontal distance S away from the center P1 of the learning marker 24 in the horizontal travel direction of the article transfer device 12 and at a setup vertical distance T away from the center P1 of the learning marker 24 in the vertical travel direction of the article transfer device 12.

The learning marker 24 is configured such that learning horizontal distance information can be learned based on detection information from the travel rotary encoder 22 upon detection of at least one edge section thereof in the horizontal travel direction of the article transfer device 12 by the learning marker detection sensor 25 and that learning vertical distance information can be learned based on detection information from the travel rotary encoder 22 upon detection of both individual edge sections thereof in the horizontal travel direction of the article transfer device 12 by the learning marker detection sensor 25.

To explain further, the learning marker 24 is formed having a trapezoidal shape wherein an upper edge in the vertical travel direction of the article transfer device 12 is shorter than a lower edge. The learning marker 24 is formed such that learning horizontal distance information and learning vertical distance information can be learned based on detection information from the travel rotary encoder 22 upon detection of both individual edge sections thereof in the horizontal travel direction of the article transfer device 12 by the learning marker detection sensor 25. Learning horizontal distance information indicates a distance from the standard horizontal position to the center P1 of the learning marker 24. Learning vertical distance information indicates a distance from the standard vertical position to the center P1 of the learning marker 24.

The operation control device 23 is configured to be capable of performing learning processing in order to learn learning horizontal distance information and learning vertical distance information for each of the plurality of learning markers 24.

When it is necessary for learning horizontal distance information and learning vertical distance information to be learned with the article storage shelves 2 in an assembled condition, the operation control device 23 can perform learning processing based on, for example, instructions from a manually-operated control section and worker input.

The operation control device 23 is configured to, in a learning process and as shown in FIG. 4, control an operation of the travel electric motor 21 and an operation of the elevation electric motor 18 in order to move the article transfer device 12 in the horizontal travel direction so as to perform sequential detection of a plurality of learning markers 24 lined up in the horizontal travel direction of the article transfer device 12 using the learning marker detection sensor 25, and in addition, so as to learn learning horizontal distance information based on detection information from the travel rotary encoder 22 upon detection of at least one edge section of a learning marker 24 by the learning marker detection sensor 25 and to also learn learning vertical distance information based on detection information from the travel rotary encoder 22 upon detection of both individual edge sections of the learning marker 24 by the learning marker detection sensor 25.

Furthermore, in a learning process and as shown by an arrow of FIG. 4, when the operation control device 23 has moved the article transfer device 12 to an edge section of the article storage shelf 2 in the horizontal travel direction of the article transfer device 12, the operation control device 23 performs a turn-back operation thereof at that edge section of the article storage shelf 2, and at a position adjacent in the vertical travel direction of the article transfer device 12, performs sequential detection of the plurality of learning markers 24 lined up in the horizontal travel direction of the article transfer device 12 using the learning marker detection sensor 25. In this way, an operation of the travel electric motor 21 and an operation of the elevation electric motor 18 are controlled in order to move the article transfer device 12 so as to perform sequential detection of all of the plurality of learning markers 24 using the learning marker detection sensor 25.

At this time, a position of horizontal motion of the article transfer stage 12 at the storage sections 5 of each level is learning setting position B which is away from the standard vertical position by a predetermined distance in the vertical travel direction of the article transfer device 12. This learning setting distance B is, for example, when assembling the article storage shelf 2 so as to position each storage section 5 in a pre-defined design position without error, set such that the learning marker detection sensor 25 passes the center P1 of each of the plurality of learning markers 24 lined up in the horizontal travel direction of the article transfer device 12.

Hereinafter, a method of finding learning horizontal distance information and learning vertical distance information in a learning process is explained with reference to FIG. 6.

First of all, the learning horizontal distance information X is explained.

By applying Equation 1 below, the operation control device 23 determines the learning horizontal distance information X from a standard horizontal position to a center P1 of the learning marker 24 using a detection distance V1 from the travel rotary encoder 22 upon detection of an edge section (point A1) of the learning marker 24 by the learning marker detection sensor 25 and a detection distance V2 from the travel rotary encoder 22 upon detection of another edge section (point A2) of the learning marker 24 by the learning marker detection sensor 25.

$X = (V1 + V2)/2$ (Equation 1)

Next, the learning vertical distance information Y is explained.

A position of horizontal motion of the article transfer device 12 in the learning process is the learning setting position B. A distance from a standard vertical position to the learning setting position B is a learning setting distance G. Although the learning setting position B is set such that the learning marker detection sensor 25 passes the center P1 of each of the plurality of learning markers 24 lined up in the horizontal travel direction of the article transfer device 12, as a result of error, etc. during assembly of the article storage shelf 2, in actuality, the learning setting position B passed by the learning marker detection sensor 25 may deviate from the center P1 of the learning marker 24. Accordingly, the learning vertical distance information Y is determined by determining a deviation amount (Q2−Q1) of the learning setting position B from the center P1 of the learning marker 24 in the vertical travel direction of the article transfer device 12.

By applying Equation 2 to Equation 5 as explained hereinafter, the operation control device 23 determines the learning vertical distance information Y from the standard vertical position to the center P1 of the learning marker 24 using the detection distance V1 from the travel rotary encoder 22 upon detection of an edge section (point A1) of the learning marker 24 by the learning marker detection sensor 25, the detection distance V2 from the travel rotary encoder 22 upon detection of another edge section (point A2) of the learning marker 24 by the learning marker detection sensor 25, a length R1 of an upper side of the learning marker 24, a width R2 of the learning marker 24 at the center P1 thereof, a distance Q2 from an upper edge of the learning marker 24 to the center P1 thereof (a distance between a point A3 and a point A5 on the learning marker 24), and the learning setting distance G.

R1, R2, and Q2 are fixed values determined by a size of the trapezoidal learning marker 24.

First of all, by applying Equation 2 below, a distance W1 between the point A1 and a point A4 on the learning marker 24 is determined from the detection distances V1, V2 from the travel rotary encoder 22 and the length R1 of the upper side of the learning marker 24. Furthermore, by applying Equation 3 below, a distance W2 between a point A6 and the point A5 on the learning marker 24 is determined from the length R1 of the upper side of the learning marker 24 and the width R2 of the learning marker 24 at the center P1 thereof.

As the triangle A3, A4, A1 and the triangle A3, A5, A6 are similar, the relationship between the distance Q1 between point A3 and point A4, the distance W1 between the point A1 and the point A4, the distance Q2 between the point A3 and the point A5, and the distance W2 between the point A6 and the point A5 is Q1:W1=Q2:W2. Accordingly, the distance Q1 between the point A3 and the point A4 can be determined by applying Equation 4 below.

Finally, the deviation amount (Q2−Q1) of the learning setting position B with respect to the center P1 of the learning marker 24 is determined using the distance Q1 between the point A3 and the point A4 and the distance Q2 between the point A3 and the point A5, and by applying Equation 5 below, the learning vertical distance information Y from the standard vertical position to the center P1 of the learning marker 24 is determined using this deviation amount (Q2−Q1) and the learning setting distance G.

$$W1=((V2-V1)-R1)/2 \quad \text{(Equation 2)}$$

$$W2=(R2-R1)/2 \quad \text{(Equation 3)}$$

$$Q1=W1 \times Q1/W2 \quad \text{(Equation 4)}$$

$$Y=G-(Q2-Q1) \quad \text{(Equation 5)}$$

Figure 7:
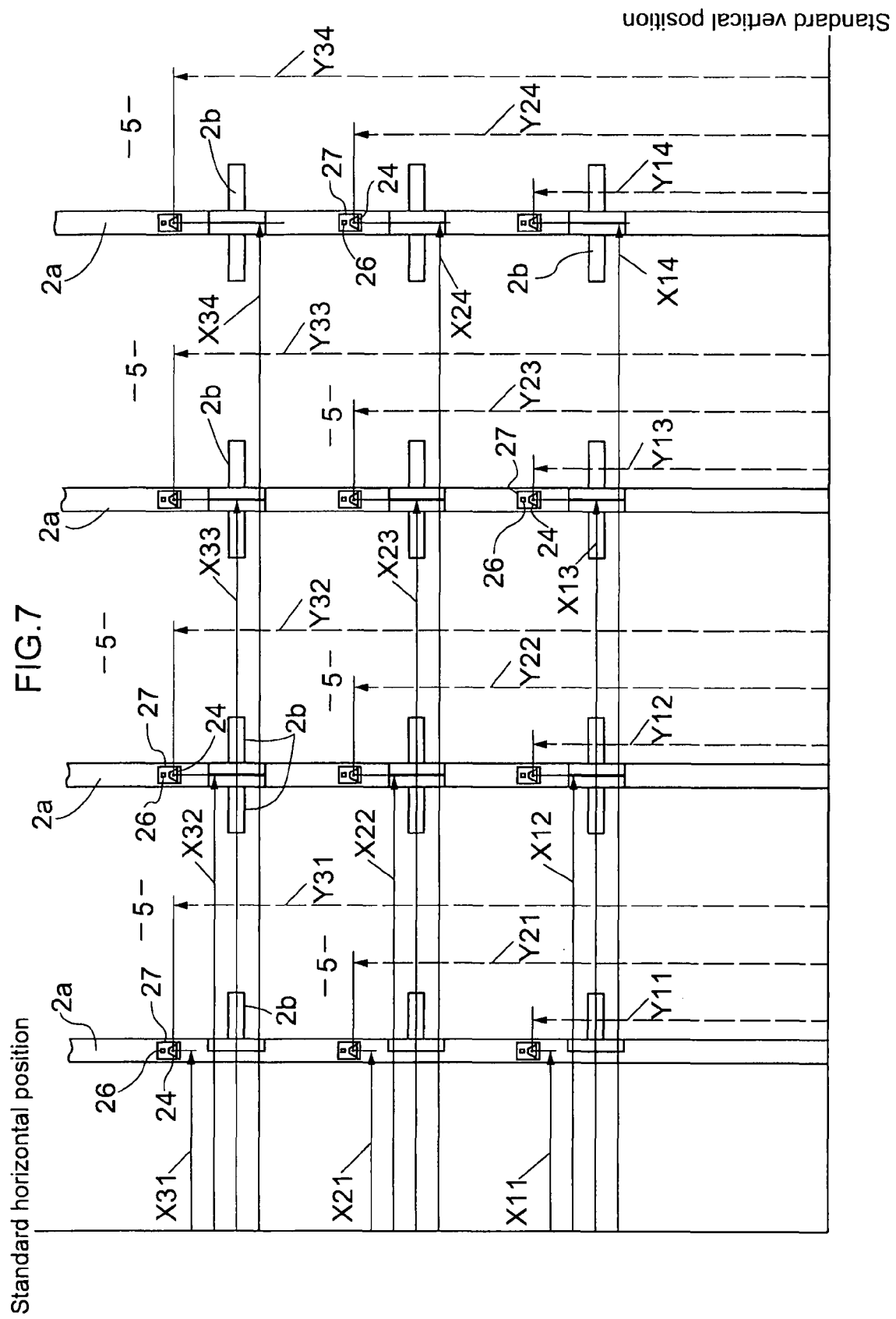
FIG. 7 is a view illustrating a part of an article storage shelf.

Upon detection of each of the learning markers 24 using the learning marker detection sensor 25, the operation control device 23 determines the learning horizontal distance information X and the learning vertical distance information Y related to that learning marker 24. That is to say, as shown in FIG. 7, the operation control device 23 determines the learning horizontal distance information X1, X12, X13, X14 and the learning vertical distance information Y1, Y12, Y13, Y14 related to the plurality of learning markers 24 lined up in the horizontal travel direction of the article transfer device 12.

When the operation control device 23 has moved the article transfer device 12 horizontally to an edge section of the article storage shelf 2, the operation control device 23 performs a turn-back operation thereof at that edge section of the article storage shelf 2, and performs sequential detection of a plurality of learning markers 24 lined up in the horizontal travel direction of the article transfer device 12 at storage sections 5 of a level one level higher using the learning marker detection sensor 25. That is to say, the article transfer device 12 is moved horizontally at the learning setting position B in the vertical travel direction of the article transfer device 12, and the learning horizontal distance information X21, X22, X23, X24 and the learning vertical distance information Y21, Y22, Y23, Y24 related to the plurality of learning markers 24 lined up in the horizontal travel direction of the article transfer device 12 are determined.

By moving the article transfer device 12 horizontally at the learning setting position B in the vertical travel direction of the article transfer device 12 such that when the operation control device 23 has moved the article transfer device 12 horizontally to an edge section of the article storage shelf 2, the operation control device 23 performs a turn-back operation thereof at that edge section of the article storage shelf 2, and performs sequential detection of a plurality of learning markers 24 lined up in the horizontal travel direction of the article transfer device 12 at storage sections 5 of a level one level higher using the learning marker detection sensor 25, the operation control device 23 determines the learning horizontal distance information X31, X32, X33, X34 and the learning vertical distance information Y31, Y32, Y33, Y34.

In this way, the operation control device 23 repeatedly performs a turn-back operation of the article transfer device 12 at an edge section of the article storage shelf 2, elevation thereof to a learning setting position B corresponding to storage sections 5 of a level one level higher, and horizontal motion thereof, and the operation control device 23 learns learning horizontal distance information and learning vertical distance information related to all of the plurality of learning markers 24. This learning horizontal distance information and learning vertical distance information is stored for each of the corresponding storage sections 5 in a memory of the operation control device 23.

The operation control device 23 is configured such that, when learning horizontal distance information and learning vertical distance information related to all of the plurality of learning markers 24 has been learned, the operation control device 23 determines target horizontal distance information and target vertical distance information based on that learned learning horizontal distance information and learning vertical distance information together with information corresponding to installation setting conditions.

To explain further, the installation setting condition is set such that the target stop position is located at a setup horizontal distance S away from the center P1 of the learning marker 24 in the horizontal travel direction of the article transfer device 12 and at a setup vertical distance T away from the center P1 of the learning marker 24 in the vertical travel direction of the article transfer device 12. Accordingly, the operation control device 23 determines, from the learned learning horizontal distance information X and the setup horizontal distance S, the target horizontal distance information Mx (=X−S) for the target stop position M, and determines, from the learned learning vertical distance information Y and the setup vertical distance T, the target vertical distance information My (=Y+T) for the target stop position M.

In this way, in a condition wherein the article storage shelves 2 are assembled, the operation control device 23 determines the target horizontal distance information and the target vertical distance information for a target stop position at each of the plurality of storage sections 5.

Furthermore, if the article storage shelves 2 can be assembled such that each storage section 5 is positioned without error at a pre-defined design position, a target stop position corresponding to each of the plurality of storage sections 5 can, even if the article storage shelves 2 are not assembled in actuality, be determined as a preliminary-reference target stop position M1. Accordingly, preliminary-reference target horizontal distance information and target vertical distance information related to the preliminary-reference target stop position M1 can be determined in advance of assembly of the article storage shelves 2.

The operation control device 23 determines an error ΔX between the preliminary-reference target horizontal distance information related to the preliminary-reference target stop position M1 and the target horizontal distance information related to the actual target stop position M determined through processing such as learning processing, and an error ΔY between the preliminary-reference target vertical distance information related to the preliminary-reference target stop position M1 and the target vertical distance information related to the actual target stop position M determined through processing such as learning processing. The operation control device 23 can, as target horizontal distance information and target vertical distance information related to the target stop position, acquire preliminary-reference target horizontal distance information related to the preliminary-reference target stop position M1 and corrected using the error ΔX and preliminary-reference target vertical distance information related to the preliminary-reference target stop position M1 and corrected using the error ΔY.

In order to move the article transfer device 12 to a target stop position corresponding to the load placing stand 6, the operation control device 23 is required to acquire target horizontal distance information and target vertical distance information related to the target stop position corresponding to the load placing stand 6. Accordingly, the operation control device 23 is configured to determine target horizontal distance information and target vertical distance information related to the target stop position corresponding to the load placing stand 6.

The operation control device 23 can use various determination methods as a method of determining target horizontal distance information and target vertical distance information related to the target stop position corresponding to the load placing stand 6. For example, the target horizontal distance information and target vertical distance information can be determined by transferring the article 1 with respect to the load placing stand 6 in actuality using the article transfer device 12. Furthermore, in a similar way to determination of the target stop position corresponding to the storage section 5, the load placing stand 6 can be provided with the learning marker 24, and the operation control device 23 can determine the target horizontal distance information and target vertical distance information by learning the learning horizontal distance information and learning vertical distance information related to that learning marker 24.

Figure 8:
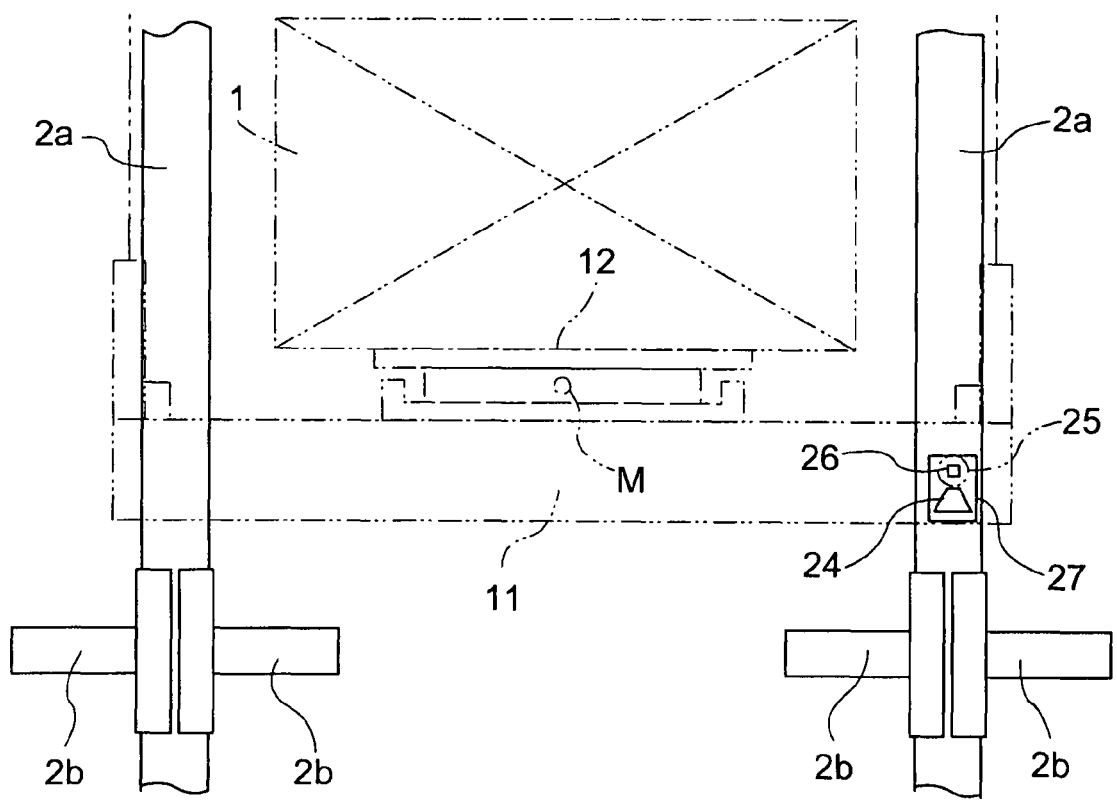
FIG. 8 is an enlarged view of a storage section.

In addition to the learning marker 24, each of the plurality of storage sections 5 is, as shown in FIG. 8, provided with a stop position confirmation marker 26 at an installation position in the horizontal travel direction and the vertical travel direction of the article transfer device 12 set such that detection thereof by the learning marker detection sensor 25 is possible when the article transfer device 12 is positioned at the target stop position M.

The operation control device 23 is configured to judge that an error has occurred when, upon stopping of the article transfer device 12 at the target stop position, the stop position confirmation marker 26 is not detected by the learning marker detection sensor 25. The operation control device 23 is configured to stop an operation of the article transfer device 12 and to notify of the occurrence of the error upon judgment thereby that an error has occurred. Accordingly, it is possible to prevent mistaken loading and unloading of the article 1 when the article transfer device 12 is not positioned at the target stop position and to avoid collision of the article 1 with the supports 2a and the mounting and support sections 2b.

The stop position confirmation marker 26 is positioned such that, as shown in FIG. 5, a center P2 thereof is displaced by the setup horizontal distance S from the target stop position M towards a side of displacement from a standard horizontal position in the horizontal travel direction of the article transfer device 12 and is displaced by a first setup vertical distance T1 from the target stop position M towards a side of approach to a standard vertical position in the vertical travel direction of the article transfer device 12. In terms of the vertical travel direction, the learning marker 24 is positioned such that the center P1 thereof is displaced by a second setup vertical distance T2 from the center P2 of the stop position confirmation marker 26 in a direction of the standard horizontal position.

The stop position confirmation marker 26 is formed as a regular tetragon with a width thereof in the horizontal travel direction of the article transfer device 12 being equal to a with thereof in the vertical travel direction of the article transfer device 12. The width of the stop position confirmation marker 26 in the horizontal travel direction and the vertical travel direction of the article transfer device 12 is suitable for an allowable range of positional deviation of the article transfer device 12 with respect to the target stop position when the article transfer device 12 is moved to the target stop position. Furthermore, it is desirable that the width of the stop position confirmation marker 26 in the horizontal travel direction and the vertical travel direction of the article transfer device 12 is a smaller width within a range wherein accurate detection by the learning marker detection sensor 25 is possible.

Figure 6:
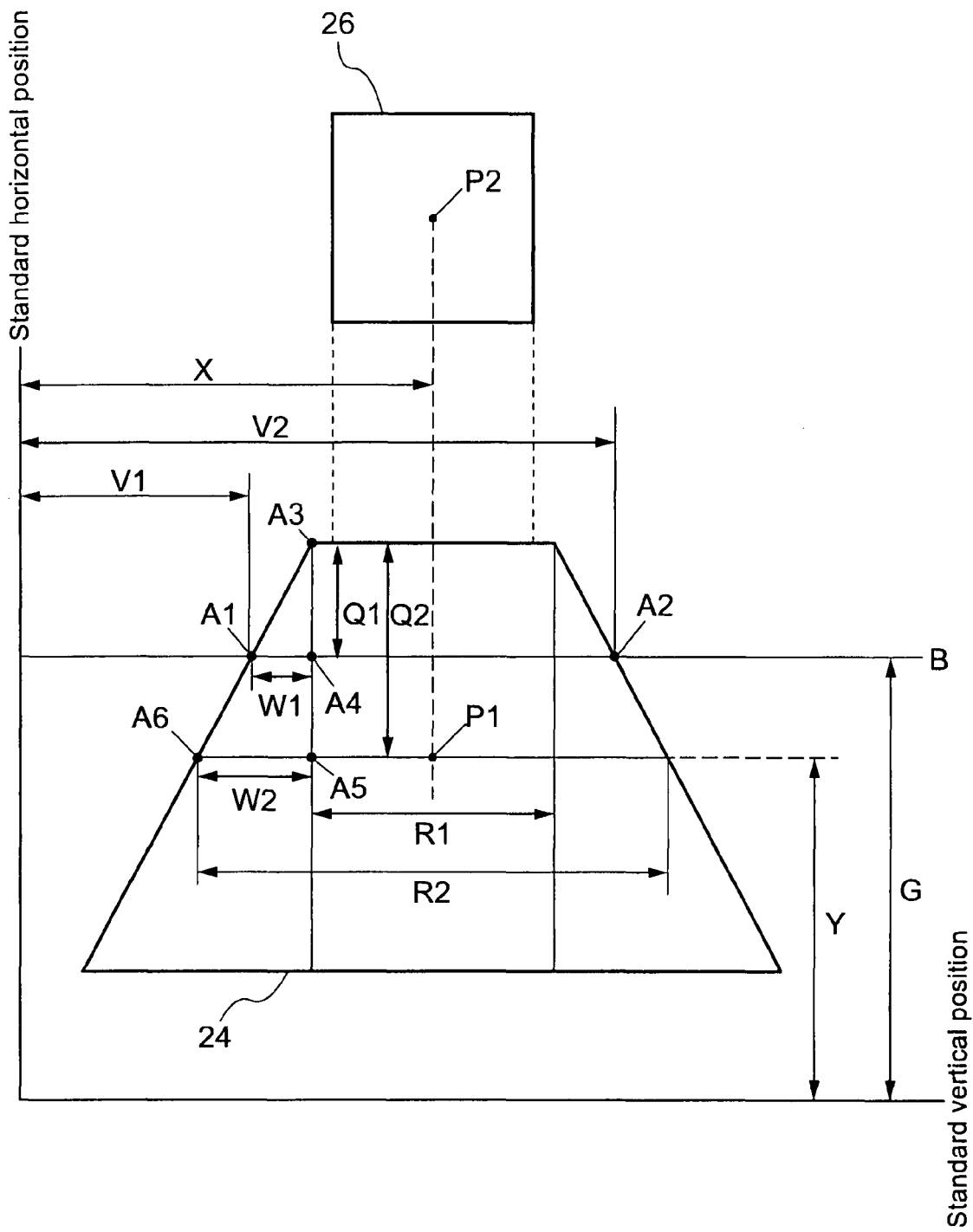
FIG. 6 is a view illustrating a learning marker and a stop-position confirmation marker.

As shown in FIG. 6, the learning marker 24 has a width larger than a width of the stop position confirmation marker 26 in the horizontal travel direction of the article transfer device 12. That is to say, an upper side of the learning marker 24 having the smallest width is larger than a width of the stop position confirmation marker 26 in the horizontal travel direction of the article transfer device 12. Accordingly, in a learning process, the operation control device 23 can judge whether the learning marker 24 or the stop position confirmation marker 26 is being detected by the learning marker detection sensor 25, and can prevent mistaken learning of learning horizontal distance information and learning vertical distance information.

Figure 9:
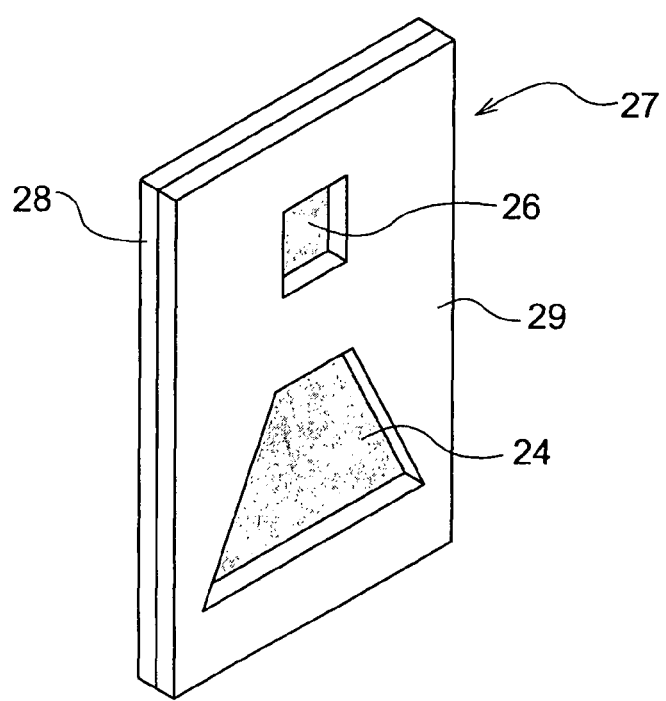
FIG. 9 is a view illustrating a learning marker and a stop-position confirmation marker.

As shown in FIG. 9, the learning marker 24 and the stop position confirmation marker 26 are provided on a single base 27, attached to the storage section 5. The base 27 comprises a rectangular reflecting body 28 and a rectangular non-reflecting body 29 of the same size of the reflecting body 28 and overlaid thereon. The learning marker 24 and the stop position confirmation marker 26 are formed through a punching process of the non-reflecting body 29. The learning marker detection sensor 25 comprises an optical sensor detecting the learning marker 24 and the stop position confirmation marker 26 by projecting measurement-purpose light and receiving reflected light.

As the learning marker 24 and the stop position confirmation marker 26 are provided on the single base 27 in this way, the learning marker 24 and the stop position confirmation marker 26 can be installed in a suitable position by simply positioning the base 27 with respect to the storage section 5 such that the installation position of the learning marker 24 satisfies the installation setting condition. Accordingly, positioning operations of the learning marker 24 and the stop position confirmation marker 26 can be simplified.

Other Embodiments (1) In the above embodiment, the learning marker 24 is configured such that learning horizontal distance information can be learned based on detection information from the travel rotary encoder 22 upon detection of at least one edge section thereof in the horizontal travel direction of the article transfer device 12 by the learning marker detection sensor 25 and that learning vertical distance information can be learned based on detection information from the travel rotary encoder 22 upon detection of both individual edge sections thereof in the horizontal travel direction of the article transfer device 12 by the learning marker detection sensor 25; however, the format of the learning marker 24 can be arbitrarily changed.

For example, by installing the trapezoidal learning marker 24 of the above embodiment so as to face sideways such that a left-side edge is bigger than a right-side edge, the learning marker 24 can also be configured such that learning vertical distance information can be learned based on detection information from the elevation rotary encoder 19 upon detection of at least one edge section thereof in the vertical travel direction of the article transfer device 12 by the learning marker detection sensor 25 and that learning horizontal distance information can be learned based on detection information of the elevation rotary encoder 19 upon detection of both individual edge sections in the vertical travel direction of the article transfer device 12 by the learning marker detection sensor 25.

In such a case, in a learning process, the operation control device 23 controls an operation of the travel electric motor 21 and an operation of the elevation electric motor 18 in order to move the article transfer device 12 in the vertical travel direction so as to perform sequential detection of a plurality of learning markers 24 lined up in the vertical travel direction of the article transfer device 12 using the learning marker detection sensor 25, and in addition, learns learning vertical distance information based on detection information from the elevation rotary encoder 19 upon detection of at least one edge section of the learning marker 24 using the learning marker detection sensor 25 and also learn learning horizontal distance information based on detection information from the elevation rotary encoder 19 upon detection of both individual edge sections of the learning marker 24 using the learning marker detection sensor 25.

(2) Although in the above embodiment, the shape of the learning marker 24 is indicated as being a trapezoid, for example, an isosceles triangle, a right-angle triangle, or a semicircle, etc. can be applied, and the shape of the learning marker 24 can be arbitrarily changed. In terms of a shape of the learning marker 24, a shape being symmetric about a center in one direction of the horizontal travel direction and the vertical travel direction of the article transfer device 12 and wherein a width thereof changes with distance in the other direction such as, for example, an isosceles triangle, etc. is desirable.

(3) In the above embodiment, the installation setting condition at the installation position of the learning marker 24 is set to a condition whereby the target stop position is located at a setup horizontal distance S away from the center P1 of the learning marker 24 in the horizontal travel direction of the article transfer device 12 and at a setup vertical distance T away from the center P1 of the learning marker 24 in the vertical travel direction of the article transfer device 12; however, the condition used as the installation setting condition corresponding to the installation position of the learning marker 24 can be arbitrarily changed.

For example, the learning marker 24 can be installed in a state satisfying a first installation setting condition for determining a setup position of the stop position confirmation marker 26, the stop position confirmation marker 26 can be installed in a state satisfying a second installation setting condition for determining target horizontal distance information and target vertical distance information, and the installation setting condition can comprise the first installation setting condition and the second installation setting condition. In such a case, the target horizontal distance information and the target vertical distance information are determined based on the learned learning horizontal distance information and learning vertical distance information and on the first installation setting condition and the second installation setting condition.

(4) In the above embodiment, of the target stop position for loading (storing) and the target stop position for extraction (removal), the target stop position for loading is used as the target stop position; however, the target stop position for extraction out can be used as the target stop position. That is to say, the position at which to set the target stop position with respect to each of the storage sections 5 can be arbitrarily changed.

(5) In the above embodiment, in a learning process, the operation control device 23 controls an operation of the travel electric motor 21 and an operation of the elevation electric motor 18 in order to move the article transfer device 12 so as to perform sequential detection of all of the plurality of learning markers 24 using the learning marker detection sensor 25, in a configuration whereby when the operation control device 23 has moved the article transfer device 12 to an edge section of the article storage shelf 2 in the horizontal travel direction of the article transfer device 12, the operation control device 23 performs a turn-back operation thereof at that edge section of the article storage shelf 2, and at a position adjacent in the vertical travel direction of the article transfer device 12, performs sequential detection of a plurality of learning markers 24 lined up in the horizontal travel direction of the article transfer device 12 using the learning marker detection sensor 25; however, the way in which, in a learning process, the operation control device 23 moves the article transfer device 12 so as to perform sequential detection of all of the plurality of learning markers 24 using the learning marker detection sensor 25 can be arbitrarily changed.

For example, the article transfer device 12 can be moved so as to perform sequential detection of all of the plurality of learning markers 24 using the learning marker detection sensor 25 in a configuration whereby after moving the article transfer device 12 in a reciprocating fashion from an edge section of the article storage shelf 2 to the other edge section of the article storage shelf 2 in the horizontal travel direction of the article transfer device 12, sequential detection of a plurality of learning markers 24 lined up in the horizontal travel direction of the article transfer device 12 is performed at a position adjacent in the vertical travel direction of the article transfer device 12 using the learning marker detection sensor 25.

(6) Although, in the above embodiment, stop position confirmation markers 26 are provided, the present invention can be put into practice without providing these stop position confirmation markers 26.

(7) Although, in the above embodiment, a travel rotary encoder 22 is provided as a means for horizontal travel distance detection, any means for distance detection of the conventional technology using electromagnetic waves, light, or audio waves, etc. can be used. For example, an optical-type range finder, etc. can be applied, and the distance detection means to be used as the horizontal travel distance detection means can be arbitrarily changed.

Similarly, furthermore, with regard also to the means for vertical travel distance detection, any distance detection means of the conventional technology can be arbitrarily used.

The invention claimed is:

1. A method for operating an article storage facility, the article storage facility comprising:
   an article storage shelf having a plurality of storage sections lined up in a vertical direction and a horizontal direction, wherein the plurality of storage sections are lined up in a plurality of vertically layered rows of storage sections extending in the horizontal direction and a plurality of horizontally layered columns of storage sections extending in the vertical direction;
   a transfer device configured to transfer an article out of and into the storage section;
   an article transporting device having a horizontal travel device configured to move the transfer device horizontally within a traveling space in front of the article storage shelf and a vertical travel device configured to move the transfer device vertically within the traveling space in front of the article storage shelf;
   a horizontal travel distance detection device configured to detect a horizontal travel distance in a horizontal travel direction of the transfer device from a standard horizontal position to the transfer device;
   a vertical travel distance detection device configured to detect a vertical travel distance in a vertical travel direction of the transfer device from a standard vertical position to the transfer device;
   a plurality of learning markers installed for each of the plurality of storage sections based on an installation setting condition for determining target horizontal distance information and target vertical distance information for each of the plurality of storage sections;
   a learning marker detection device, provided on the article transporting device so as to move as one with the transfer device, configured to detect the learning markers; and
   an operation control device configured to control an operation of the horizontal travel device, an operation of the vertical travel device, and an operation of the transfer device;
   the method comprising the steps of:
   (a) controlling an operation of the horizontal travel device to move the transfer device in the horizontal travel direction along a first row of storage sections;
   (b) sequentially detecting with the learning marker detection device both edge sections in the horizontal direction of each learning marker installed for each of the storage sections lined up in the first row of storage sections;
   (c) obtaining detection information from the horizontal travel distance detection device upon detection of both edge sections in the horizontal direction of each learning marker installed for each of the storage sections lined up in the first row of storage sections;
   (d) acquiring learning distance information in the horizontal direction based on the detection information from the horizontal travel distance detection device;
   (e) acquiring learning distance information in the vertical direction based on the detection information from the horizontal travel distance detection device; and
   (f) repeating steps (a)-(e) for a second row of storage sections.

2. The method of claim 1, wherein: further comprising the step of:
   prior to step (f), controlling an operation of the vertical travel device to move the transfer device in the vertical travel direction to the second row of storage sections.

3. The method of claim 2, wherein the second row is adjacent to the first row in the vertical direction and the method further comprises the step of:
   after the step of controlling an operation of the vertical travel device to move the transfer device in the vertical travel direction to the second row of storage sections and prior to step (f), performing a turn-back operation at an edge section of the article storage shelf such that the horizontal travel device moves the transfer device away from the edge section in the horizontal travel direction along the second row of storage sections.

4. The method of claim 1, wherein:
   a stop position confirmation marker is provided for each of the plurality of storage sections at a position in the horizontal travel direction and the vertical travel direction of the transfer device such that the position is detectable by the learning marker detection device when the transfer device is in the target stop position, the method further comprising:
   a step of the operation control device judging that an error has occurred in a case where the stop position confirmation marker is not detected by the learning marker detection device when the transfer device is positioned in the target stop position.

5. The method of claim 4, wherein:
   the learning marker has a width larger than a width of the stop position confirmation marker in one direction of the horizontal travel direction and the vertical travel direction of the transfer device.

6. The method of claim 4, wherein:
   the learning marker and the stop position confirmation marker are provided on a single base attached to the storage section.

7. The method of claim 5, wherein:
   the learning marker has a trapezoidal shape.

8. A method for operating an article storage facility, the article storage facility comprising:
   an article storage shelf having a plurality of storage sections lined up in a vertical direction and a horizontal direction, wherein the plurality of storage sections are lined up in a plurality of vertically layered rows of storage sections extending in the horizontal direction and a plurality of horizontally layered columns of storage sections extending in the vertical direction;

a transfer device configured to transfer an article out of and into the storage section;

an article transporting device having a horizontal travel device configured to move the transfer device horizontally within a traveling space in front of the article storage shelf and a vertical travel device configured to move the transfer device vertically within the traveling space in front of the article storage shelf;

a horizontal travel distance detection device configured to detect a horizontal travel distance in a horizontal travel direction of the transfer device from a standard horizontal position to the transfer device;

a vertical travel distance detection device configured to detect a vertical travel distance in a vertical travel direction of the transfer device from a standard vertical position to the transfer device;

a plurality of learning markers installed for each of the plurality of storage sections based on an installation setting condition for determining target horizontal distance information and target vertical distance information for each of the plurality of storage sections;

a learning marker detection device, provided on the article transporting device so as to move as one with the transfer device, configured to detect the learning markers; and an operation control device configured to control an operation of the horizontal travel device, an operation of the vertical travel device, and an operation of the transfer device;

the method comprising the steps of:

(a) controlling an operation of the vertical travel device to move the transfer device in the vertical travel direction along a first column of storage sections;

(b) sequentially detecting with the learning marker detection device both edge sections in the vertical direction of each learning marker installed for each of the storage sections lined up in the first column of storage sections;

(c) obtaining detection information from the vertical travel distance detection device upon detection of both edge sections in the vertical direction of each learning marker installed for each of the storage sections lined up in the first column of storage sections;

(d) acquiring learning distance information in the vertical direction based on the detection information from the vertical travel distance detection device;

(e) acquiring learning distance information in the horizontal direction based on the detection information from the vertical travel distance detection device; and (f) repeating steps (a)-(e) for a second column of storage sections.

9. The method of claim 8, further comprising the step of:

prior to step (f), controlling an operation of the horizontal travel device to move the transfer device in the horizontal travel direction to the second column of storage sections.

10. The method of claim 9, wherein the second column is adjacent to the first column in the horizontal direction and the method further comprises the step of:

after the step of controlling an operation of the horizontal travel device to move the transfer device in the horizontal travel direction to the second column of storage sections and prior to step (f), performing a turn-back operation at an edge section of the article storage shelf such that the vertical travel device moves the transfer device away from the edge section in the vertical travel direction along the second column of storage sections.

11. The method of claim 8, wherein:

a stop position confirmation marker is provided for each of the plurality of storage sections at a position in the horizontal travel direction and the vertical travel direction of the transfer device such that the position is detectable by the learning marker detection device when the transfer device is in the target stop position, the method further comprising:

a step of the operation control device judging that an error has occurred in a case where the stop position confirmation marker is not detected by the learning marker detection device when the transfer device is positioned in the target stop position.

12. The method of claim 11, wherein:

the learning marker has a width larger than a width of the stop position confirmation marker in one direction of the horizontal travel direction and the vertical travel direction of the transfer device.

13. The method of claim 11, wherein:

the learning marker and the stop position confirmation marker are provided on a single base attached to the storage section.

14. The method of claim 12, wherein:

the learning marker has a trapezoidal shape.

* * * * *

UNITED STATES PATENT AND TRADEMARK OFFICE
CERTIFICATE OF CORRECTION

PATENT NO.      : 7,953,514 B2                                              Page 1 of 1
APPLICATION NO. : 11/893706
DATED           : May 31, 2011
INVENTOR(S)     : Jaesook Kim It is certified that error appears in the above-identified patent and that said Letters Patent is hereby corrected as shown below:

Column 18, Line 19, Claim 2, "claim 1, wherein:" should read -- claim 1, --

Signed and Sealed this
Eleventh Day of October, 2011

David J. Kappos
*Director of the United States Patent and Trademark Office*